United States Patent [19]

Ambrusko

[11] Patent Number: 4,761,632
[45] Date of Patent: Aug. 2, 1988

[54] TRI-STATE DIRECTIONAL SIGNAL SYSTEM

[76] Inventor: Paul C. Ambrusko, 3609 Silver Park Dr. #20, Suitland, Md. 20746

[21] Appl. No.: 64,470

[22] Filed: Jun. 22, 1987

[51] Int. Cl.$^4$ .............................................. B60Q 1/46
[52] U.S. Cl. .................................... 340/81 R; 340/54; 340/55; 340/73; 340/78
[58] Field of Search .................. 340/81 R, 54, 55, 56, 340/67, 73, 74, 78; 307/10 LS

[56] References Cited

U.S. PATENT DOCUMENTS

| | | | |
|---|---|---|---|
| 1,172,794 | 2/1916 | Hatashita | 340/140 |
| 2,304,861 | 12/1942 | Thee | 340/113 |
| 3,720,917 | 3/1973 | Dyksterhouse | 340/67 |
| 3,745,524 | 7/1973 | Suzuki | 340/76 |
| 4,431,984 | 2/1984 | Bileck | 340/87 |
| 4,504,820 | 3/1985 | Krumrein | 340/73 |
| 4,550,305 | 10/1985 | Bookbinder | 340/134 |
| 4,587,512 | 5/1986 | Casey | 340/52 |
| 4,609,904 | 9/1986 | Paine | 340/52 |
| 4,613,927 | 9/1986 | Brandt | 340/87 |
| 4,638,296 | 1/1987 | Heidman | 340/83 |

Primary Examiner—Donnie L. Crosland

[57] ABSTRACT

A switchable conductive path in the form of an electrical circuit that inhibits flashing of the front directional signal lamp for a duration determined by the vehicle operator, while allowing the corresponding rear directional signal lamp to flash normally. Hence, a third state of directional signal logic is achieved; the first two logic states being both front and rear directional signal lamps flashing, or both front and rear directional signal lamps off. An inhibit control is provided for the vehicle operator to activate the tri-state signaling mode when otherwise normal signaling would entice someone to enter the roadway between his present location and that of the intended turn. The tri-state signaling mode serves a dual purpose: the rear directional signal continues to flash normally alerting traffic behind the vehicle of intent to turn, while the absence of front directional signal flashing notifies potential interlopers of intent to travel beyond their position. After passing the potential interloper, the inhibit control is released, and the tri-state mode is deactivated, whereupon normal directional signal operation resumes.

4 Claims, 7 Drawing Sheets

TRI-STATE DIRECTIONAL SIGNAL SYSTEM

BACKGROUND OF INVENTION

This invention inhibits the flashing of the front directional signal of a vehicle when signaling to turn or change lanes, while allowing the corresponding rear directional signal to flash in normal manner. It is to be used when otherwise normal signaling would entice pedestrians or operators of other vehicles to enter roadway before the turn is made.

BACKGROUND OF PRIOR ART

Vehicle directional signals have been in use for many years and their meaning is generally well known. If the front and rear directional signals on any one side are flashing, it is understood that a turn will be made in that direction; if no directional signals are flashing, it is understood that no immediate turn is to be made. Hence, there are two logical states of conventional directional signal systems; either both front and rear signals (on either side) flashing, or both front and rear signals (on either side) off.

SUMMARY OF THE INVENTION

A problem which I call "intercept ambiguity" exists in conventional directional signaling systems. Intercept ambiguity occurs whenever a vehicle operator signals to turn and a potential interloper is between his position and the location of his intended turn (see FIG. 1). The potential interloper may be either a pedestrian or the operator of another vehicle wishing to enter the roadway. This invention serves to create a third state of directional signal logic with a two-fold purpose; the rear directional signal flashes normally to alert traffic behing vehicle of intent to turn, while the absence of front directional signal flashing notifies the potential interloper of intent to travel beyond his position, thus avoiding a potential accident situation.

To activate the tri-state mode, the operator moves the inhibit control while signaling in normal fashion. The inhibit control causes the switchable conductive path to open, preventing flashing of the front directional signal, while allowing the rear directional signal to continue flashing at its normal rate and intensity. After passing the potential interloper, the operator releases the inhibit control which is then spring-returned, and normal signal flashing of both front and rear signal lamps is resumed. Upon completion of the turn, the directional signal lever will be reset to the neutral position by conventional mechanical means.

Additional reference can be made to Disclosure Document 169217 filed Apr. 30, 1987.

DETAILED DESCRIPTION OF THE DRAWINGS

Figure 1:
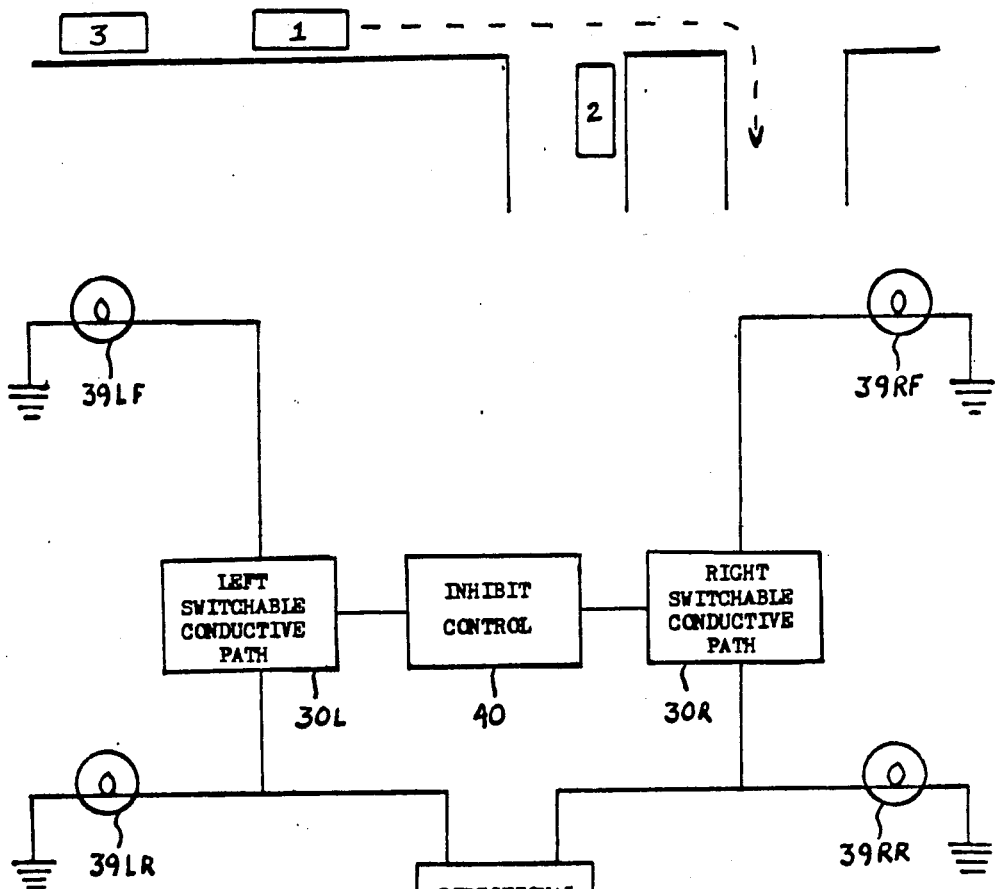
FIG. 1 is a situational use diagram of the invention.

Referring to FIG. 1 the operator of vehicle 1 intends to turn into roadway B and signals to do so, alerting vehicle 3 of said intentions. The operator of vehicle 1 observes vehicle 2 attempting to enter traffic and activates the Tri-State Directional Signal System. This allows the rear signal to continue flashing while the front signal is inhibited, thereby eliminating any enticement for vehicle 2 to enter traffic under the assumption that vehicle 1 intends to turn in roadway A. After passing the "intercept ambiguity" area, the operator of vehicle 1 deactivates the Tri-State mode and normal signaling is resumed. It can readily be seen that a potential accident situation can be avoided by the use of this invention.

Figure 2:
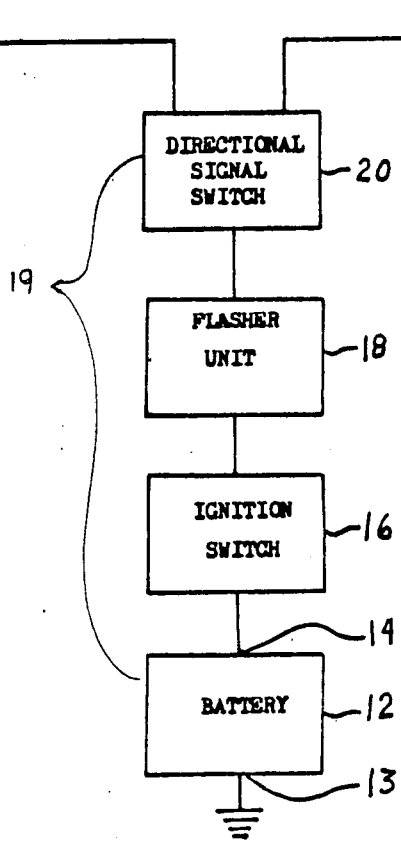
FIG. 2 is a block diagram of the invention as designed for conventional vehicle directional signal systems.

FIG. 2 is a block diagram of the invention showing a selective flashing current source 19 comprised of a battery 12, an ignition switch 16, a flasher unit 18, and a directional signal switch 20, serially connected to provide selective flashing of the left rear signal lamp 39LR, and the left front signal lamp 39LF via the left switchable conductive path 30L; or the right rear signal lamp 39RR, and the right front signal lamp 39RF via the right switchable conductive path 30R. The inhibit control 40 is connected to activate and deactivate whichever switchable conductive path (30L or 30R) selected by the directional signal switch 20.

Figure 3A:
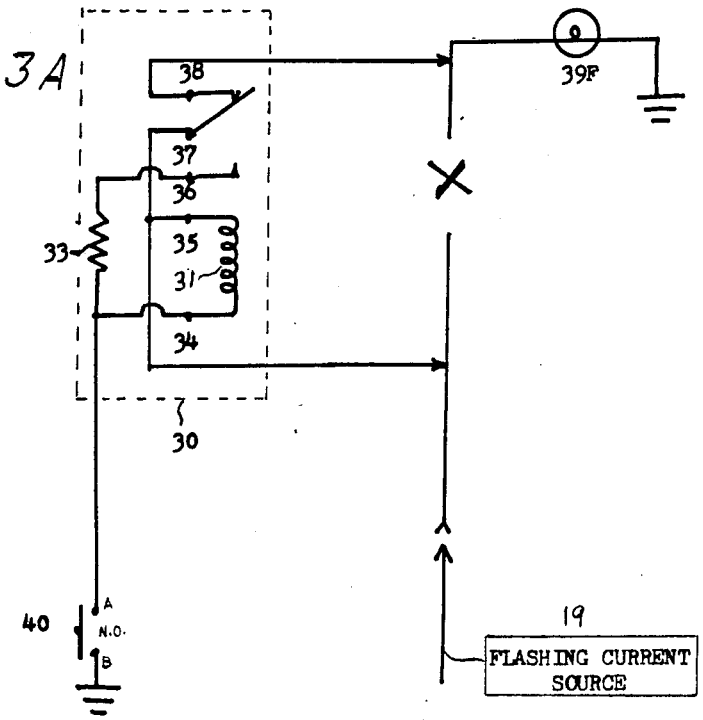
FIG. 3A is a schematic diagram of a relay switchable conductive path.

Referring to FIG. 3A the switchable conductive path 30 is connected inbetween the front directional signal lamp 39F and the flashing current source 19, allowing current flow through primary contact 37 and normally closed contact 38. When the inhibit control 40 is pressed, flashing current 19 flows through relay coil 31 opening said contacts 37 and 38, and closing contacts 37 and the normally open 36. The relay coil 31 is so designed as to energize before signal lamp 39F reaches a state of illuminosity. The remainder of the pulse is conducted through substitute load 33 which is so designed in combination with the relay coil 31 to sustain normal flashing current. The relay coil 31 is then deactivated for the duration between pulses and activated again by the next pulse before signal lamp 39F achieves illuminosity. This operation will continue until the inhibit control 40 is released, whereupon normal signaling will take place.

Figure 3B:
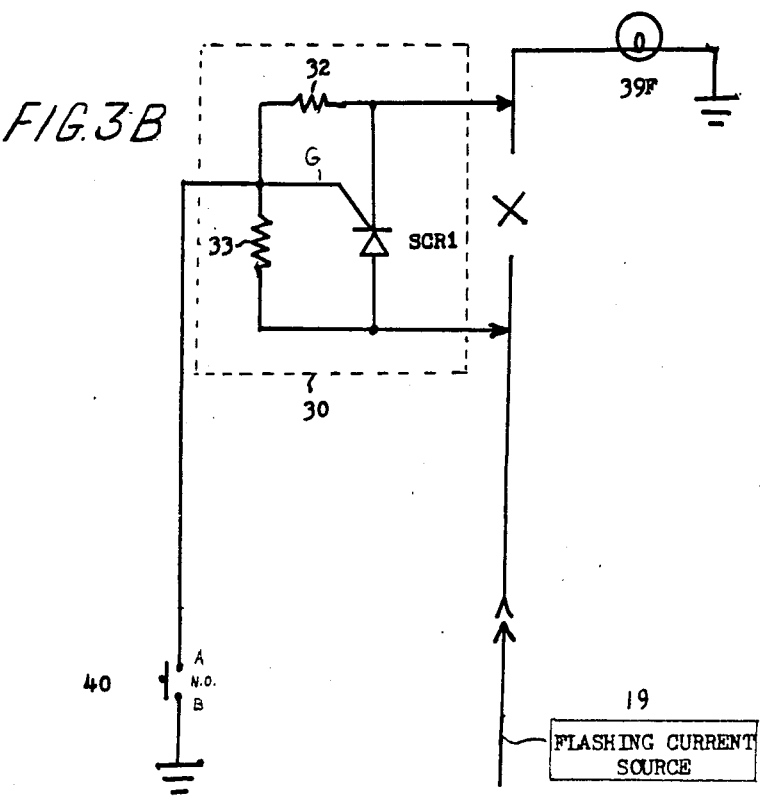
FIG. 3B is a schematic diagram of a solid state switchable conductive path.

The diagram of FIG. 3B shows a silicon controlled rectifier used as a switching device. In this case, the silicon controlled rectifier SCR1 is biased in a normally conducting state until the inhibit control 40 is closed, whereupon the SCR1 will latch into an open state during the period between pulses. The bias resistor 32 is of sufficient value to prevent illuminosity of signal lamp 39F through substitute load 33, when the switchable conductive path 30 is in a non-conducting state. When the inhibit control 40 is released, the positive portion of the flashing current source 19 will be sensed at the gate G of SCR1 enabling conduction of the switchable conductive path 30 and normal signaling will resume.

Figure 4:
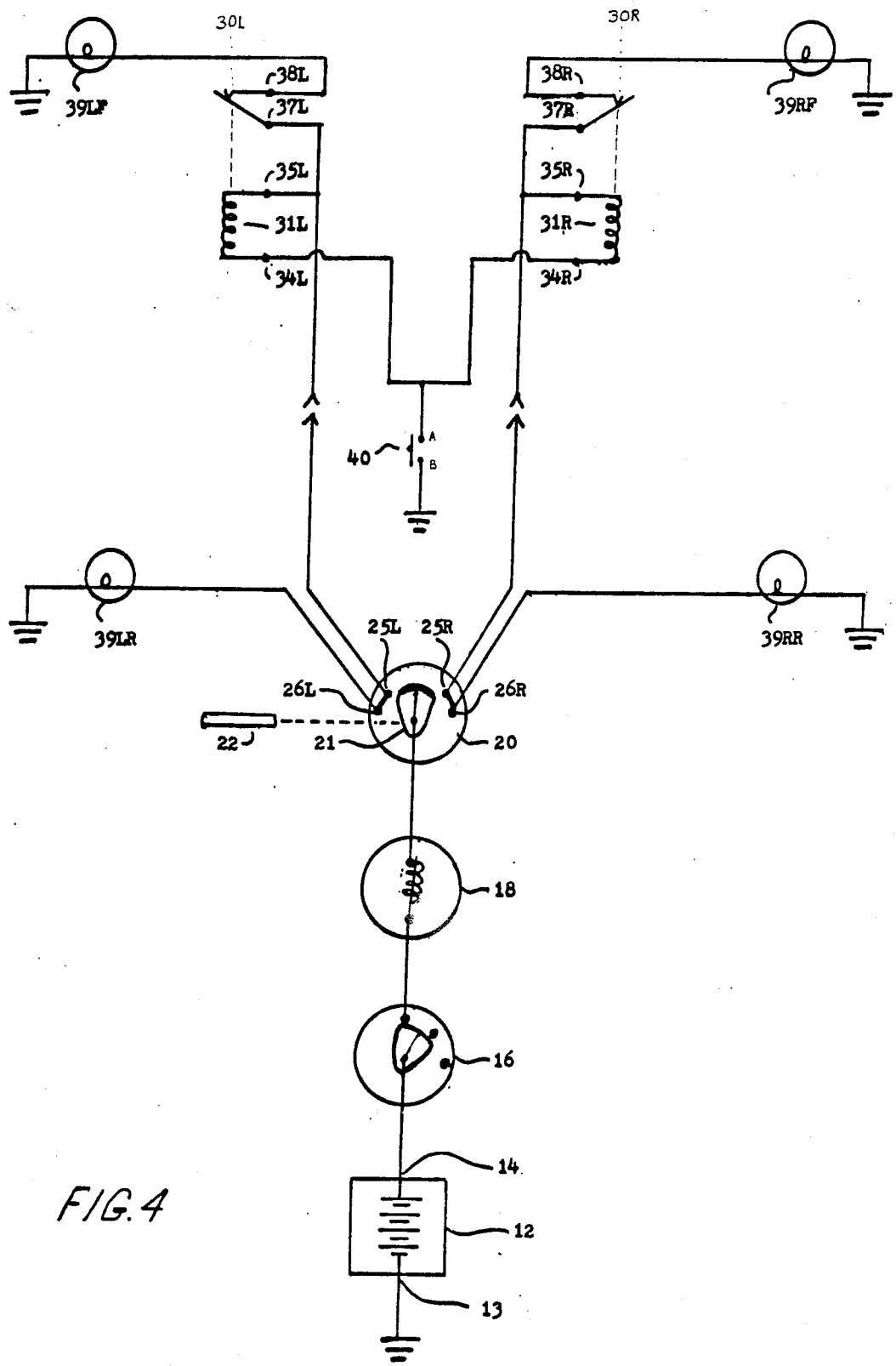
FIG. 4 is a schematic diagram of the invention using a low resistance relay.

In FIG. 4 a left and right Tri-State Directional Signal System is shown, a battery 12 has the negative terminal 13 connected to a common ground and the positive terminal 14 connected to an ignition switch 16. A flasher unit 18 is connected between the ignition switch 16 and the rotor 21 of directional signal switch 20. A left rear signal lamp 39LR and a right rear signal lamp 39RR are respectively connected to stationary contacts 26L and 26R of directional signal switch 20. The left front signal lamp 39LF is connected via normally closed contact 38L and primary contact 37L to the stationary contact 25L of the directional signal switch 20. The right front signal lamp 39RF is connected via normally closed contact 38R and primary contact 37R to the stationary contact 25R of directional signal switch 20. Relay coil 31L has terminal 35L connected to primary contact 37L and terminal 34L connected to contact A of the inhibit control 40. Relay coil 31R has terminal 35R connected to primary contact 37R and terminal 34R connected to contact A of inhibit control 40. Terminal B of inhibit control 40 is connected to ground.

When signaling a right turn, signal lever 22 is pushed upward connecting rotor 21 to interconnected stationary contacts 25R and 26R of directional signal switch 20. This provides flashing current to the right rear signal lamp 39RR directly, and to the right front signal lamp via primary contact 37R and normally closed contact 38R. To activate the tri-state mode of operation, inhibit control 40 is pressed. This energizes relay coil 31R by the flashing current pulse, and disconnects the primary contact 37R from the normally closed contact 38R before the right front signal lamp 39RF achieves illuminosity. The conductance of relay coil 31R is such that it will, in combination with the rear signal lamp 39RR, sustain operation of the flasher unit 18, while preventing illuminosity of the non-selected left front signal lamp 39LF through the series combination of coils 31L and 31R and contacts 37L and 38L. This operation of opening the conductive path of contacts 37R and 38R will repeat with each each flashing pulse for the duration the inhibit control 40 is pressed. The operation of the left side is similar to that of the right.

Figure 5:
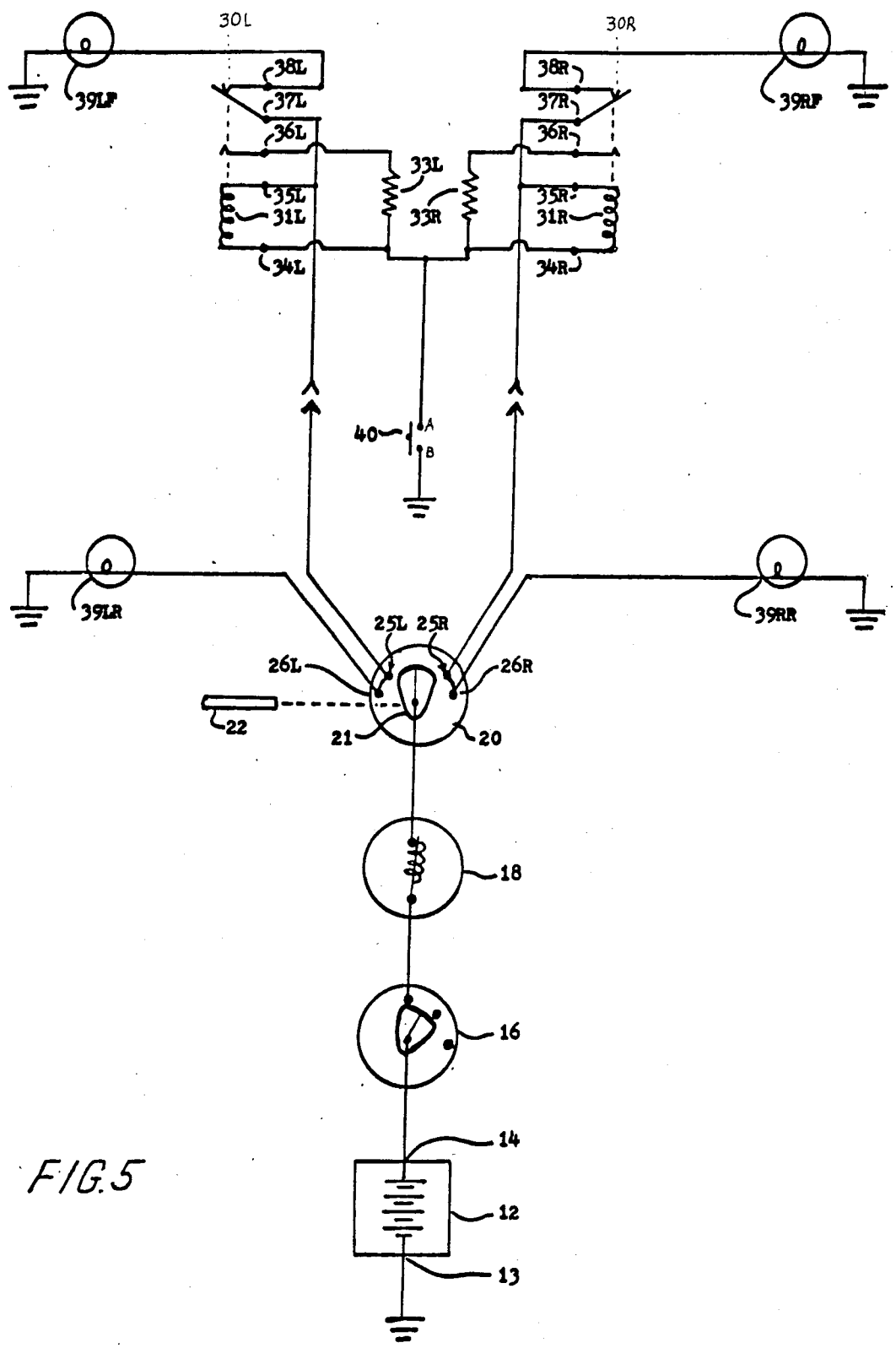
FIG. 5 is a schematic diagram of the invention using a high resistance relay.

The circuit shown in FIG. 5 operates the same as that of FIG. 4; the difference being the addition of normally open contacts 36L and 36R and their associated substitute loads, 33L and 33R respectively. In this embodiment, relay coils 31L and 31R have sufficiently high resistance to prevent any substantial electrical interaction between the coil of one side during normal operation, and the other lamp through its normally closed contacts.

This allows additional switchable conductive paths to be added to any vehicle with added flashing side marker signals. The substitute loads 33L and 33R are switched into the circuit by normally open contacts 36L and 36R respectively, the substitute loads 33L and 33R are designed to sustain flashing current and may be omitted on directional signal systems using a solid state flasher unit.

Figure 6B:
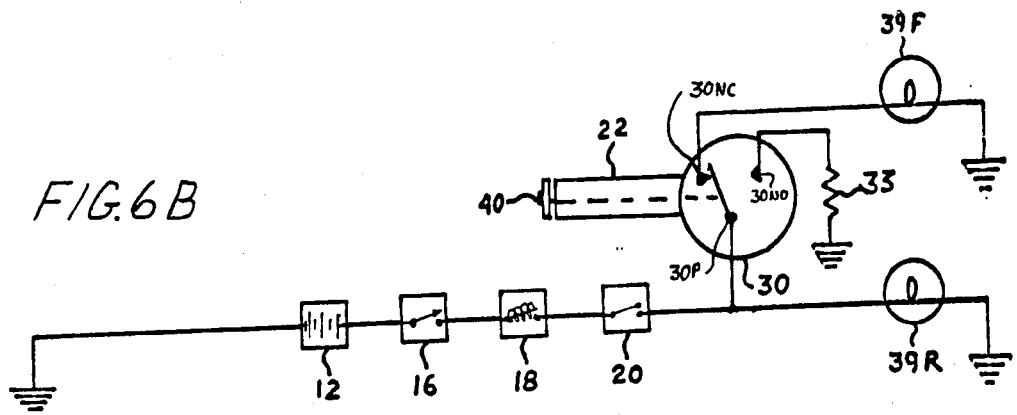
FIG. 6B is a diagram of a combined inhibit control/switchable conductive path with the addition of a substitute load.
Figure 6A:
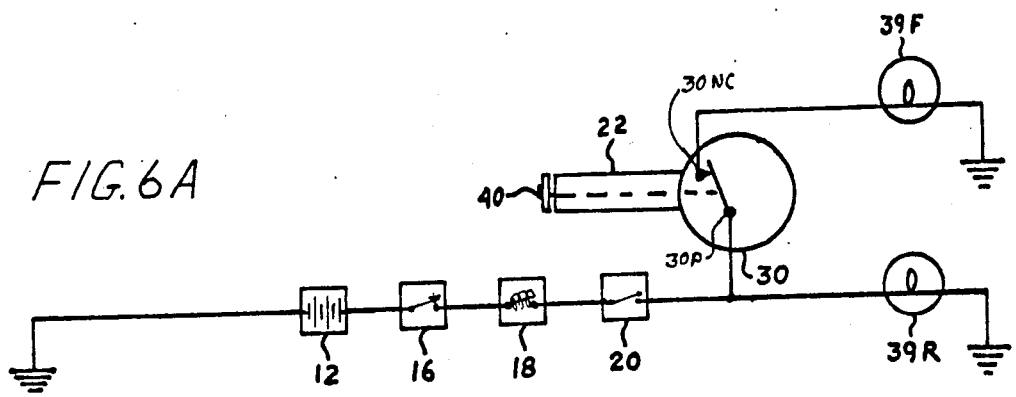
FIG. 6A is a diagram of a combined inhibit control/switchable conductive path.

FIGS. 6A and 6B show the inhibit control 40 constructively integrated with the switchable conductive path 30. Selective flashing current is provided by the series combination of a battery 12, an ignition switch 16, a flasher unit 18, and directional signal switch 20. Flashing current is applied directly to the rear signal lamp 39R, and via contacts 30P and 30NC of switchable conductive path 30. As mentioned before, an optional substitute load 33 is provided to maintain flashing current through the primary contact 30P and the normally open contact 30NO. When the inhibit control 40 is pushed, the contacts 30P and 30NC will open, interrupting flashing current to the front signal lamp 39F.

Figure 7:
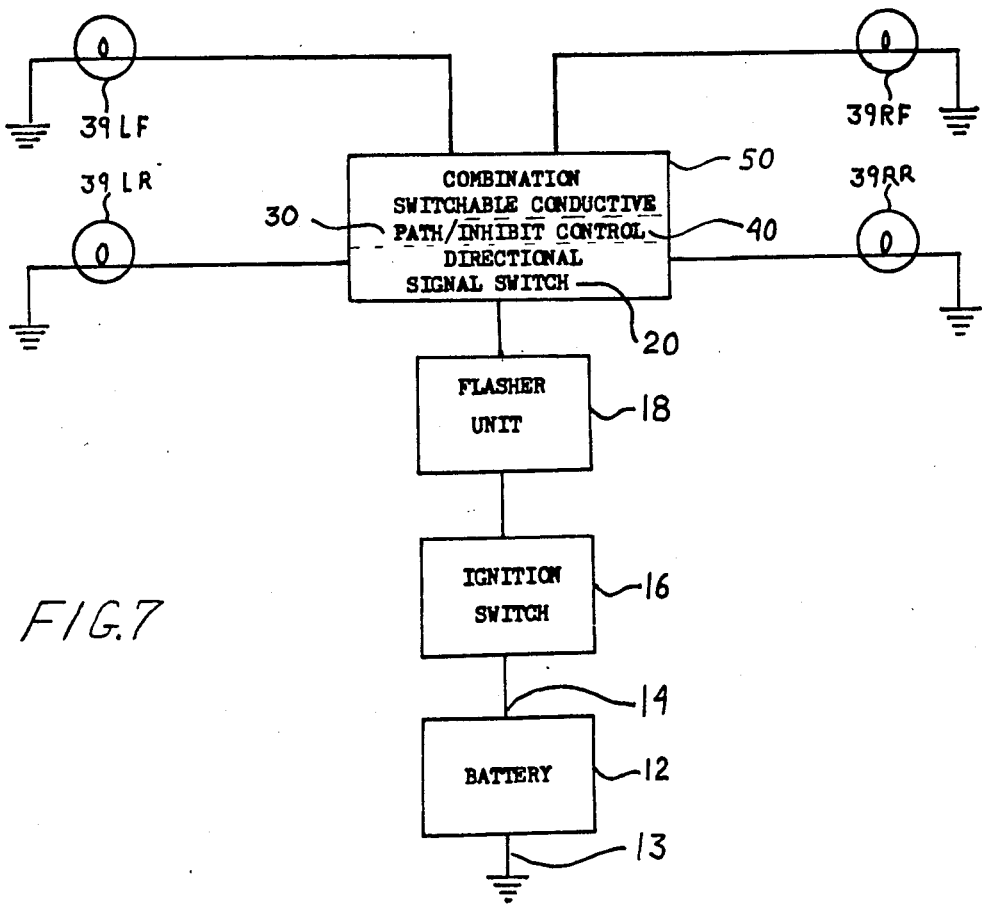
FIG. 7 is a block diagram of the preferred embodiment of the invention.

FIG. 7 is a block diagram of the preferred embodiment, which is functionaly the same as FIG. 2 with the exception of having the switchable conductive path 30, the inhibit control 40, and the directional signal switch 20 all constructively integrated into one unit 50.

Figure 8A:
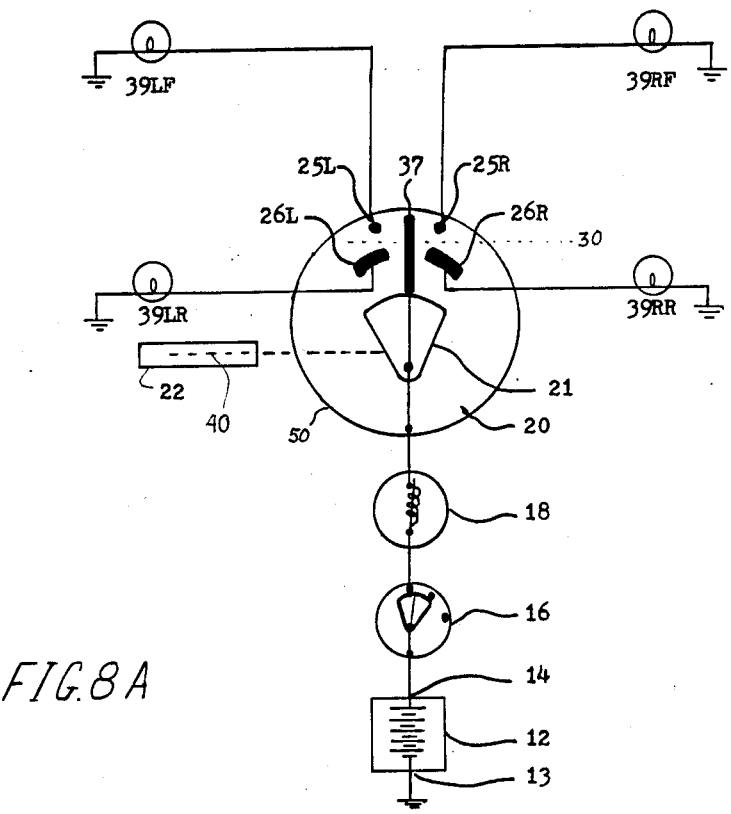
FIG. 8A is a schematic diagram of the preferred embodiment using "extended position" inhibit control.
Figure 8B:
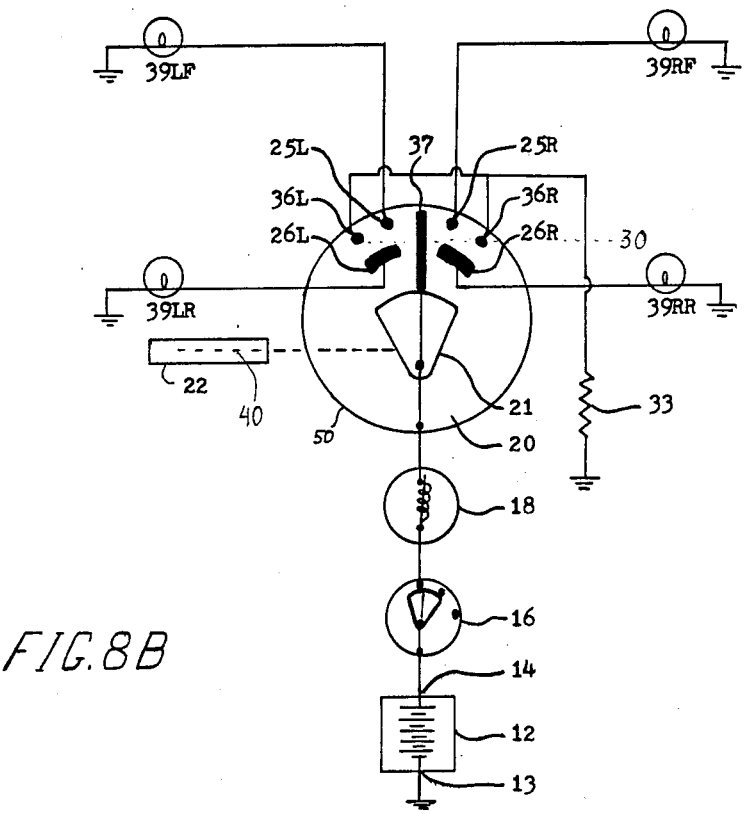
FIG. 8B is a schematic diagram of the preferred embodiment using "extended position" inhibit control with a substitute load.

Referring now to the preferred embodiments of FIGS. 8A and 8B, a battery 12, an ignition switch 16, and a flasher unit 18, are serially connected to provide flashing current to primary contact 37 which is mounted to rotor 21 of directional signal switch 20. Stationary contacts 25L and 25R of directional signal switch 20 are connected to the left front directional signal lamp 39LF and the right front directional signal lamp 39RF respectively. Stationary contacts 26L and 26R of directional signal switch 20 are connected to the left rear directional signal lamp 39LR and the right rear directional signal lamp 39RR respectively. Signal lever 22 is mechanically connected to rotor 21 and capable of moving primary contact 37 clockwise to a detent-held position connecting both stationary contacts 25R and 26R of directional signal switch 20. Signal lever 22 is also capable of moving primary contact 37 further in a clockwise direction, to an extended position, which is manually held and spring released, connecting only the elongated stationary contact 26R of directional signal switch 20. This is called the extended lever position, which enables the signal lever 22 to function as an inhibit control 40. It is noted that signal lever 22 can also move rotor 21 and primary contact 37 to a detent-held position connecting both stationary contacts 25L and 26L of directional signal switch 20, or further to a spring released manually held extended position which also enables signal lever 22 to function as an inhibit control 40 by connecting primary contact 37 to only the elongated stationary contact 26L of directional signal switch 20. It is noted that the combined unit comprised of the signal lever 22 (which also functions as the inhibit control 40), directional signal switch 20 (and its associated switchable conductive paths 30), is referred to by the numeral 50.

In operation, moving the signal lever 22 upward to the detent-held position provides flashing current to the right front directional signal lamp 39RF via primary contact 37 and stationary contact 25R; and to the right rear directional signal lamp 39RR via primary contact 37 and stationary contact 26R, for normal signaling. Moving the signal lever 22 further to the extended position, opens primary contact 37 and stationary contact 25R, inhibiting flashing of the right front directional signal lamp 39RF; and maintains contact between primary contact 37 and the elongated stationary contact 26R, allowing flashing current to the right rear directional signal lamp 39RR. The tri-state mode will continue until the signal lever 22 is released, and it will be spring-returned to the normal detent-held position. Both right front and right rear signal lamps (39RF and 39RR respectively) will then continue to flash until the combined directional signal switching unit 50 is reset by mechanical means following completion of the turn. In FIG. 8B, the extended lever position connects primary contact 37 to stationary contact 36R which is connected to substitute load 33 sustaining flashing current for those systems with current-dependent flashing cycles. The operation of the left side is similar to that of the right.

Figure 9:
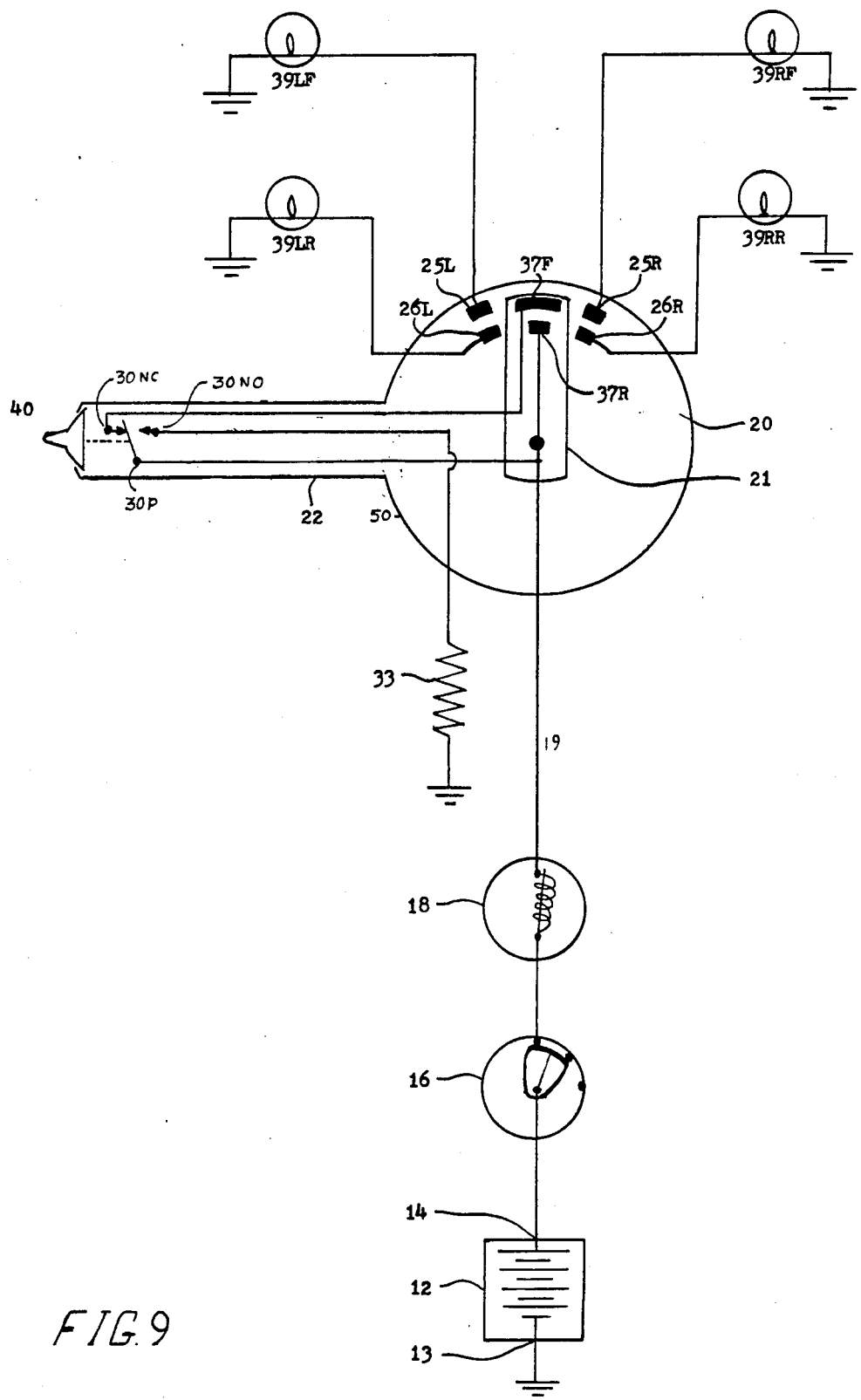
FIG. 9 is a schematic diagram of the invention using a split rotor and a push button inhibit control.

In FIG. 9, flashing current is provided to the rotor contact 37R of the directional signal switch 20 contained in the combination unit 50, by the series combination of flasher unit 18, ignition switch 16, and battery 12. Flashing current is also provided to the rotor contact 37F via switchable conductive path of normally closed contacts 30P and 30NC. When signal lever 22 is pushed upward, rotor 21 connects contacts 37F and 25R, and connects contacts 37R and 26R. This provides flashing current to front signal lamp 39RF and to rear signal lamp 39 RR. Pressing the inhibit control 40 opens contacts 30P and 30NC interrupting flashing current to the front signal lamp 39RF, and connects contacts 30NO and 30P enabling the substitute load 33 to sustain flashing current if needed as previously described. Releasing the inhibit control 40 closes contacts 30P and 30NC allowing resumption of normal directional signal flashing. The operation of the left side is similar to that of the right.

While the above descriptions contain many specificities, these should not be construed as limitations on the scope of the invention, but rather as a few examples of functional embodiments. Other embodiments with variations in design of inhibit control or switchable conductive paths are possible, but the core idea of tri-state directional signal logic remains the same. Accordingly, the scope of the invention should be determined not by the embodiments, but by the appended claims and their legal equivalents.

What is claimed is:

1. A vehicle directional signal switching circuit with conductive means to selectively interrupt normal flashing of the front directional signal while allowing the corresponding rear directional signal to flash, comprised of:
    a battery with the negative terminal connected to a common ground and the positive terminal connected to an ignition switch;
    a left and right set of rear and front directional signal lamps, with each said signal lamp having a base terminal connected to said common ground;
    a directional signal switch and a flasher unit serially connected to said ignition switch, with conductive means to selectively provide a flashing current source to said directional signal lamps;
    a switchable conductive path interconnected between said flashing current source and said front directional signal lamp;
    an inhibit control with selective means to activate and deactivate said switchable conductive path.

2. The invention as defined in claim 1 with conductive means to provide selective flashing of said rear directional signal only.

3. The invention as defined in claim 2 with said switchable conductive path and said inhibit control constructively integrated with each other.

4. The invention as defined in claim 3 constructively integrated with said directional signal switch.

* * * * *